United States Patent
Yamawaki et al.

[11] Patent Number: 6,046,835
[45] Date of Patent: Apr. 4, 2000

[54] SCANNING OPTICAL APPARATUS

[75] Inventors: Takeshi Yamawaki, Tokyo; Hiroshi Sato, Kawasaki; Kazumi Kimura, Toda, all of Japan

[73] Assignee: Canon Kabushiki Kaisha, Tokyo, Japan

[21] Appl. No.: 08/999,130

[22] Filed: Dec. 29, 1997

[30] Foreign Application Priority Data

Dec. 28, 1996  [JP]  Japan .................................... 8-357747

[51] Int. Cl.$^7$ ............................................... G02B 26/08
[52] U.S. Cl. .................. 359/205; 359/207; 359/212; 359/216; 359/217; 347/243; 347/244
[58] Field of Search ................................... 359/205–219, 359/710–711, 204; 347/258–261, 233, 241–244

[56] References Cited

U.S. PATENT DOCUMENTS

| | | | |
|---|---|---|---|
| Re. 33,721 | 10/1991 | Sato et al. ................................. | 359/198 |
| 4,623,216 | 11/1986 | Sato et al. . | |
| 4,800,401 | 1/1989 | Sato et al. ............................... | 346/108 |
| 4,804,981 | 2/1989 | Prakash et al. ........................... | 346/160 |
| 4,878,066 | 10/1989 | Shiraishi ................................... | 346/108 |
| 5,200,850 | 4/1993 | Iizuka et al. ............................. | 359/207 |
| 5,701,190 | 12/1997 | Mochizuki et al. ..................... | 359/207 |
| 5,745,277 | 4/1998 | Boku et al. .............................. | 359/207 |

FOREIGN PATENT DOCUMENTS

| | | |
|---|---|---|
| 0 813 090 A2 | 12/1997 | European Pat. Off. . |
| 2-50122 | 2/1990 | Japan . |
| 10-73778 | 3/1998 | Japan . |

Primary Examiner—James Phan
Attorney, Agent, or Firm—Fitzpatrick, Cella, Harper & Scinto

[57] ABSTRACT

In a scanning optical apparatus, a light beam emitted by a light source is caused to be obliquely incident on a deflection surface of an optical deflector in a sub scanning section through an optical device to form an image of the light beam deflectively reflected by the optical deflector on a surface to be scanned by an imaging optical system. A lateral magnification of the imaging optical system in a sub scanning direction is caused to change in accordance with a distance away from the on-axis to an off-axis along the main scanning direction.

24 Claims, 7 Drawing Sheets

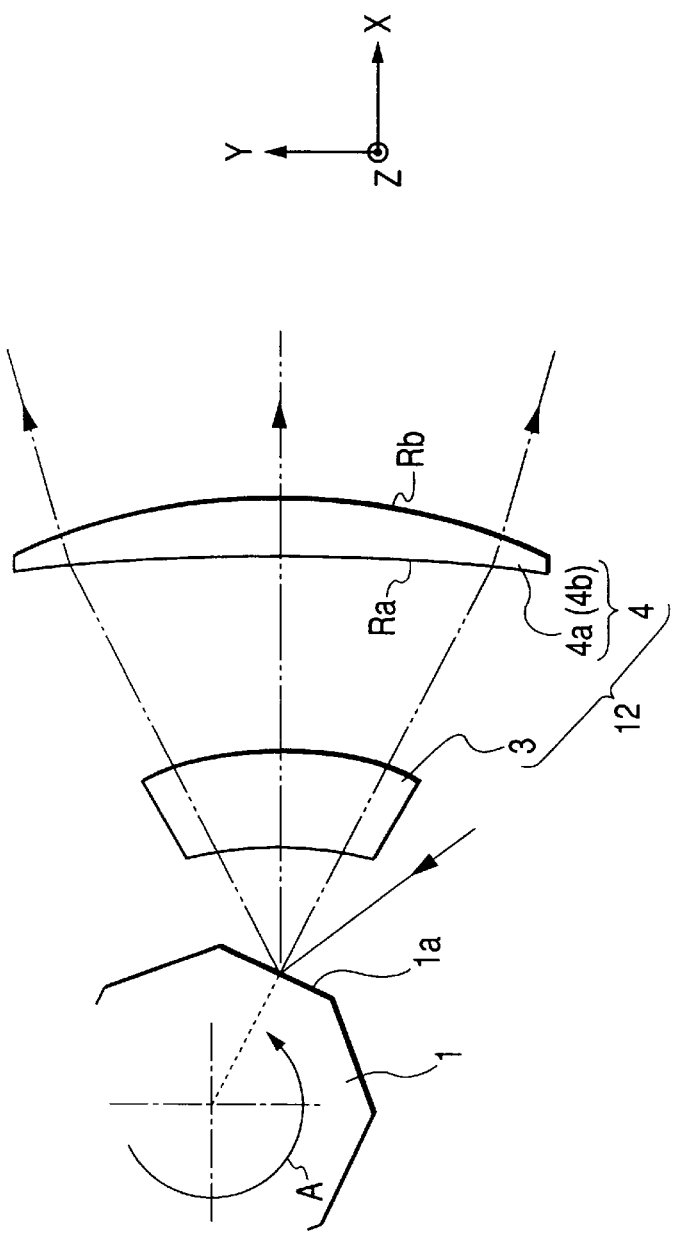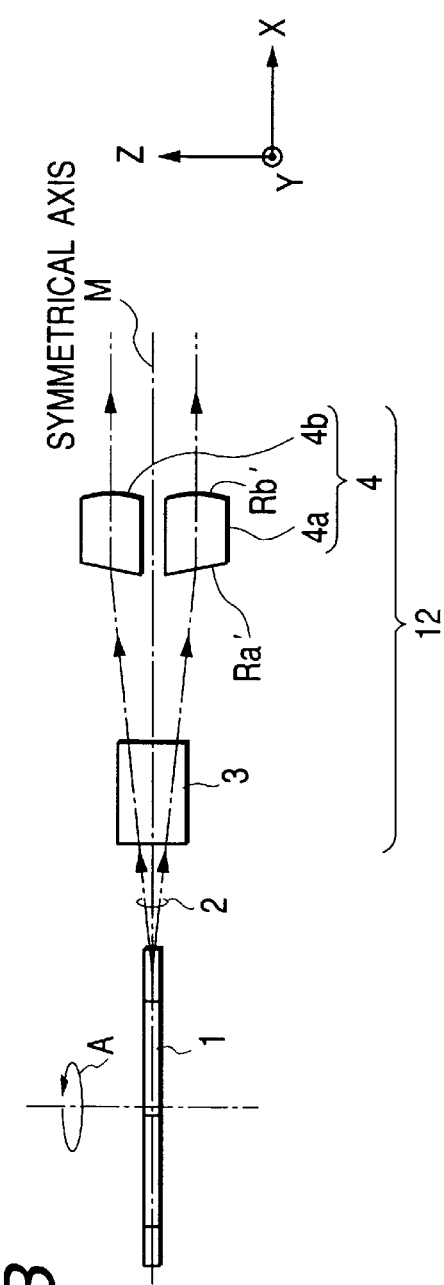
FIG. 2A
FIG. 2B

R1 SURFACE: SHAPE OF PROJECTED OF GENERATING-LINE IN Y-Z CROSS-SECTION

R2 SURFACE: SHAPE OF PROJECTED OF GENERATING-LINE IN Y-Z CROSS-SECTION

AMBIENT TEMPERATURE

ELEVATED TEMPERATURE

SCANNING OPTICAL APPARATUS

BACKGROUND OF THE INVENTION

1. Field of the Invention

The present invention relates to a scanning optical apparatus used for a laser beam printer apparatus capable of appropriately performing temperature compensation for a plastic lens applied to the optical system of the scanning optical apparatus and, more particularly, suppressing the curvature of the scanning line in an oblique incident optical system and reducing pitch or density variations in an image.

2. Related Background Art

Conventionally, a variety of multi-beam scanning optical apparatuses in which a plurality of light beams are sent onto a common scanning optical system to realize multiple colors have been proposed. In a multi-beam scanning optical apparatus of this type, when a plurality of light beams are to be independently irradiated on a predetermined target scanning surface, the light beams must be deflected/reflected by an optical deflector comprising, e.g., a polygon mirror and then separated. Light sources in the same wavelength band must be spatially separated. When light beams are obliquely incident on the deflection surface of the optical deflector within a sub scanning section, desired spatial separation is enabled.

However, in an enlargement optical system having a compact optical arrangement, the optical path length for spatial separation is short, and therefore, the oblique incident angle with respect to the deflection surface increases, resulting in a curvature of the scanning line on the target scanning surface.

To solve this problem, the present inventors have proposed, in Japanese Patent Application No. 8-174332, a technique using a toric lens whose generating-line is three-dimensionally curved and whose optical axis is decentered within a plane perpendicular to the on-axis incident light beam.

This toric lens has complex surface shapes. A lens having such complex surface shapes is manufactured by molding using a plastic material. However, the optical nature of a plastic material generally largely varies depending on the environment as compared to a glass material. For example, a change in refractive index of a plastic material due to a change in temperature is an order of magnitude or more larger than that of a glass material.

When the toric lens is manufactured without considering such an environmental variation, the focal point position shifts at elevated temperatures. For this reason, a curvature of the scanning line occurs on the image plane at elevated temperatures.

SUMMARY OF THE INVENTION

In order to solve the above problem, the present invention has as its object to provide a scanning optical apparatus which changes the sub-scanning-direction lateral magnification of a toric lens made of a plastic lens constituting one element of an imaging optical system in the main scanning direction from an on-axis position to an off-axis position to compensate for a change in image height of an off-axis light beam upon temperature elevation using nearly the same compensation value as that for a change in image height of an on-axis light beam upon temperature elevation, thereby suppressing any curvature of scanning line due to a change in ambient temperature and reducing pitch or density variations in an image.

In a scanning optical apparatus of the present invention, a light beam emitted by light source means is caused to be obliquely incident on a deflection surface of an optical deflector in a sub scanning section through optical means to form an image of the light beam deflectively reflected by the optical deflector on a surface to be scanned (scanning surface) through an imaging optical system to scan the target scanning surface with the light beam, the scanning optical apparatus has a feature that a sub-scanning-direction lateral magnification of the imaging optical system changes in a distance away from on-axis to off-axis in respect of the main scanning direction.

The apparatus is characterized in the following points.

Let $\beta$ be the sub-scanning-direction lateral magnification of the imaging optical system at the on-axis position, $\beta'$ the sub-scanning-direction lateral magnification at the off-axis position, dZ an image height displacement of an on-axis light beam upon elevation of the environmental temperature, dZ' an image height displacement difference between the on-axis light beam and an off-axis light beam upon elevation of the environmental temperature, and $\Delta dZ'$ a correction residual of the difference dZ'. Then, when the correction residual $\Delta dZ'$ is given by:

$$\Delta dZ' = |dZ' - (\beta'/\beta - 1) \cdot dZ|$$

the following condition is satisfied:

$$\Delta dZ' \leq 20 \ (\mu m)$$

The imaging optical system has a lens having a meniscus lens shape within a main scanning section, essentially consisting of plastic, and having a positive refracting power.

The imaging optical system has a cylindrical lens and a toric lens constituted by a plastic lens whose lens surface on the optical deflector side comprises a concave surface within a main scanning section.

The light source means comprises a plurality of light sources.

The optical means causes a plurality of light beams emitted by the light source means to be non-parallely incident on the deflection surface of the optical deflector.

The imaging optical system has a plurality of rotational asymmetrical lenses each having an optical axis substantially parallel to the light beam incident on the lens, and a generating-line connecting meridian-line vertices of each of the plurality of rotational asymmetrical lenses is curved in a sub scanning direction.

The deflection surface of the optical deflector and the scanning surface (recording medium surface) are made to be optically conjugate with each other within the sub scanning section by the imaging optical system.

BRIEF DESCRIPTION OF THE DRAWINGS

FIGS. 2A and 2B are sectional views respectively showing a main scanning section and a sub scanning section of the main part of the first embodiment of the present invention;

DETAILED DESCRIPTION OF THE PREFERRED EMBODIMENT

Figure 1A:
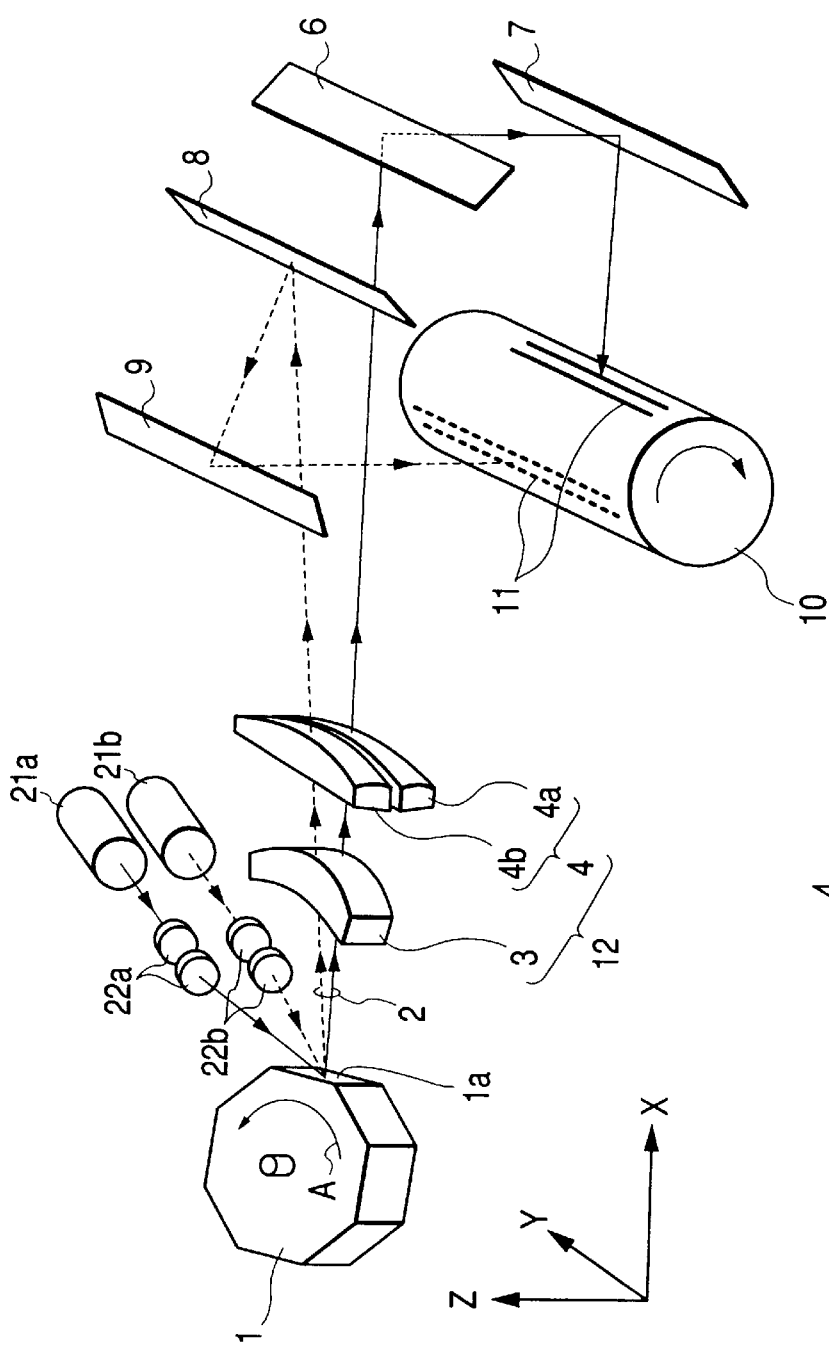
FIG. 1A is a perspective view of a scanning optical apparatus according to the first embodiment of the present invention.
Figure 1B:
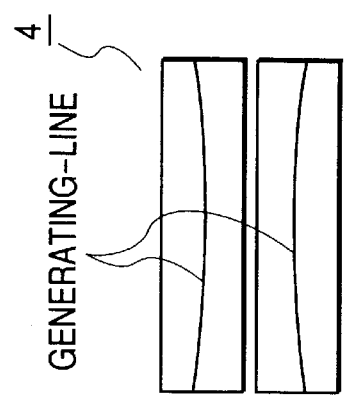
FIG. 1B is a front view of a double toric lens shown in FIG. 1A.

FIG. 1A is a perspective view of a scanning optical apparatus according to the first embodiment of the present invention, which is used for a laser beam printer apparatus. FIG. 1B is a front view of a double toric lens shown in FIG. 1A. FIGS. 2A and 2B are sectional views of an arrangement including and after an optical deflector in the sub scanning direction and in the main scanning direction, respectively, in the first embodiment of the present invention. FIGS. 2A and 2B show a state after two light beams obliquely and almost symmetrically incident on the deflection surface of the optical deflector at an angle of 6° within the sub scanning section are deflectively reflected by the deflection surface. That is, the two light beams emerge from the optical deflector making an angle of 12° with each other.

In FIG. 1A, each of two laser collimator units 21a and 21b has a light source constituted by, e.g., a semiconductor laser, and a collimator lens for collimating a light beam emitted by the light source into a parallel light beam. The laser collimator units 21a and 21b are parallely arranged to be perpendicular to the target scanning surface, i.e., parallely arranged along the sub scanning direction. Each of two cylinder units 22a and 22b has two lenses: a positive cylindrical lens (glass convex lens) consisting of a glass material having a predetermined refracting power only in the sub scanning direction and a negative cylindrical lens (plastic concave lens) consisting of a plastic material. The cylinder units 22a and 22b are arranged in correspondence with the plurality of laser collimator units 21a and 21b, respectively.

One laser collimator unit (21a or 21b) and one cylinder unit (22a or 22b) constitute one element of an optical means (oblique incident optical system) as a temperature compensation system.

An optical deflector 1 serving as a deflection means uses, e.g., a polygon mirror and is rotated by a motor (not shown) as a driving means in a direction indicated by an arrow A in FIG. 1A at a predetermined speed. Two obliquely incident light beams 2 are deflectively reflected by the polygon mirror. The light beams 2 are deflectively reflected by a deflection surface (polygon mirror surface) 1a of the polygon mirror 1 at positions where the heights in the sub scanning direction almost equal.

An imaging lens (fθ lens) 12 serves as an imaging optical system having tilt correction and fθ characteristics. The imaging lens 12 is made up of two lens systems: a cylindrical lens 3 consisting of a glass material having a predetermined refracting power only in the main scanning direction and a double toric lens 4 having a lens shape to be described later. The imaging lens 12 forms the images of the plurality of light beams deflectively reflected by the polygon mirror 1 at different exposure positions on a photosensitive drum surface (recording medium surface) (to be described later).

The double toric lens 4 of this embodiment is separated into upper and lower toric lenses 4a and 4b which are arranged to be symmetric with respect to a plane perpendicular to the rotating shaft of the polygon mirror 1 in the sub scanning direction, as shown in FIG. 2B, and have mirror-symmetrical characteristics with respect to the plane. Each of the toric lenses 4a and 4b is a plastic lens having a positive refracting power and a meniscus lens shape within the main scanning section, as shown in FIG. 2A. A first lens surface Ra on the polygon mirror 1 side is a concave surface within the main scanning section. With this arrangement, in this embodiment, the sub-scanning-direction lateral magnification changes (increases) in accordance with a distance away from the on-axis (optical axis) to the off-axis position in the main scanning direction.

In this embodiment, the two obliquely incident light beams 2 independently enter the corresponding toric lenses 4a and 4b. The two toric lenses 4a and 4b are arranged such that the light beam separation becomes 19.2 mm on the exit surface. With this arrangement, in this embodiment, optical path deflecting mirrors (beam splitter mirrors) 6 and 8 (to be described later) can be set without interfering with each other in the sub scanning direction. The optical axis of each of the toric lenses 4a and 4b is substantially parallel to the incident beam. The generating-line connecting the meridian-line vertices of each of the toric lenses 4a and 4b is curved in the sub scanning direction.

The cylindrical lens 3 has no refracting power within the sub scanning section, so only the double toric lens 4 is associated with image formation in the sub scanning direction.

Optical path bending mirrors 6 to 9 guide the corresponding light beams to different exposure positions on the surface (target scanning surface) of a photosensitive drum 10 as a recording medium. A scanning line 11 scans the photosensitive drum surface.

In this embodiment, the images of the plurality of parallel light beams from the plurality of laser collimator units 21a and 21b corresponding to the two obliquely incident light beams 2 are formed as linear images near the deflection surface 1a of the polygon mirror 1 through the corresponding cylinder units 22a and 22b. This is a typical means used to correct any tilt of the deflection surface of the polygon mirror 1 in the sub scanning direction. Within the sub scanning section, the deflection surface of the polygon mirror 1 is made to be optically conjugate with the photosensitive drum surface by the fθ lens 12. That is, a tilt correction optical system is formed within the sub scanning section.

The plurality of light beams deflectively reflected by the polygon mirror 1 are guided to exposure positions on the surface of the photosensitive drum 10 through the fθ lens 12 and the corresponding optical path bending mirrors (6 and 7, and 8 and 9). A scanning line 11 is drawn in the axial direction (main scanning direction) as the polygon mirror 1 rotates. When the photosensitive drum 10 rotates in synchronism with the rotation of the polygon mirror 1, scanning lines 11 are formed at an equal interval in the sub scanning direction. As described above, when two scanning lines 11 are independently and simultaneously irradiated on one photosensitive drum surface, two colors can be developed by one revolution of the photosensitive drum, so the speed of color printing can be increased.

Figure 3A:
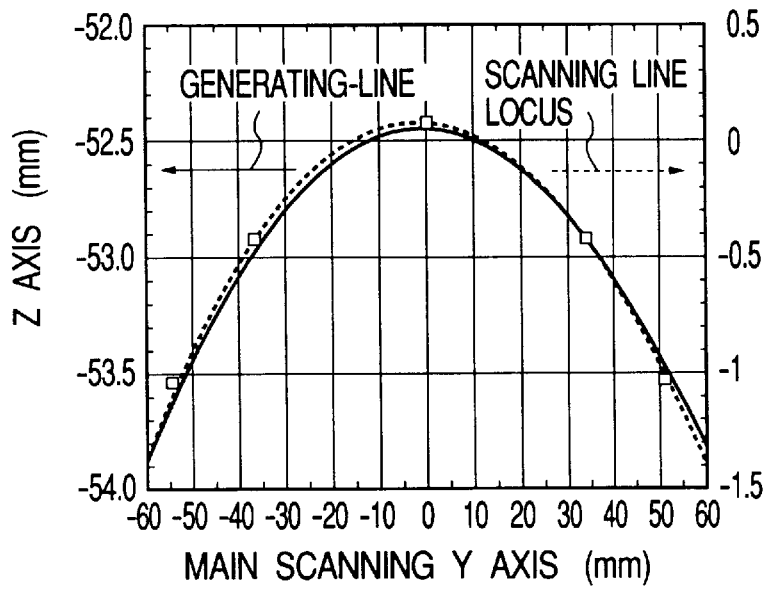
FIGS. 3A and 3B are graphs for explaining the generating-lines of the toric lens, which are projected on the Y-Z cross-section.
Figure 3B:
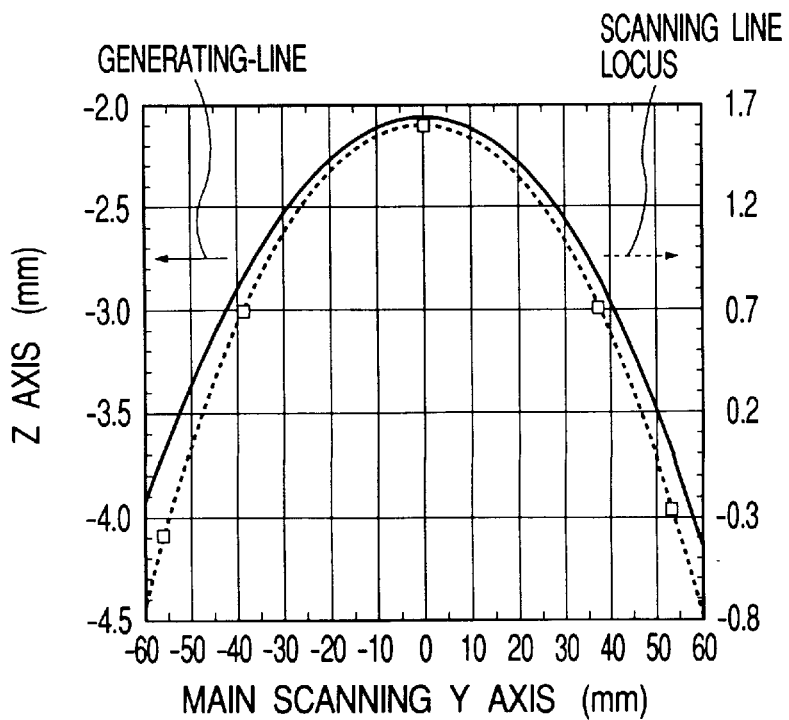
Figure 4:
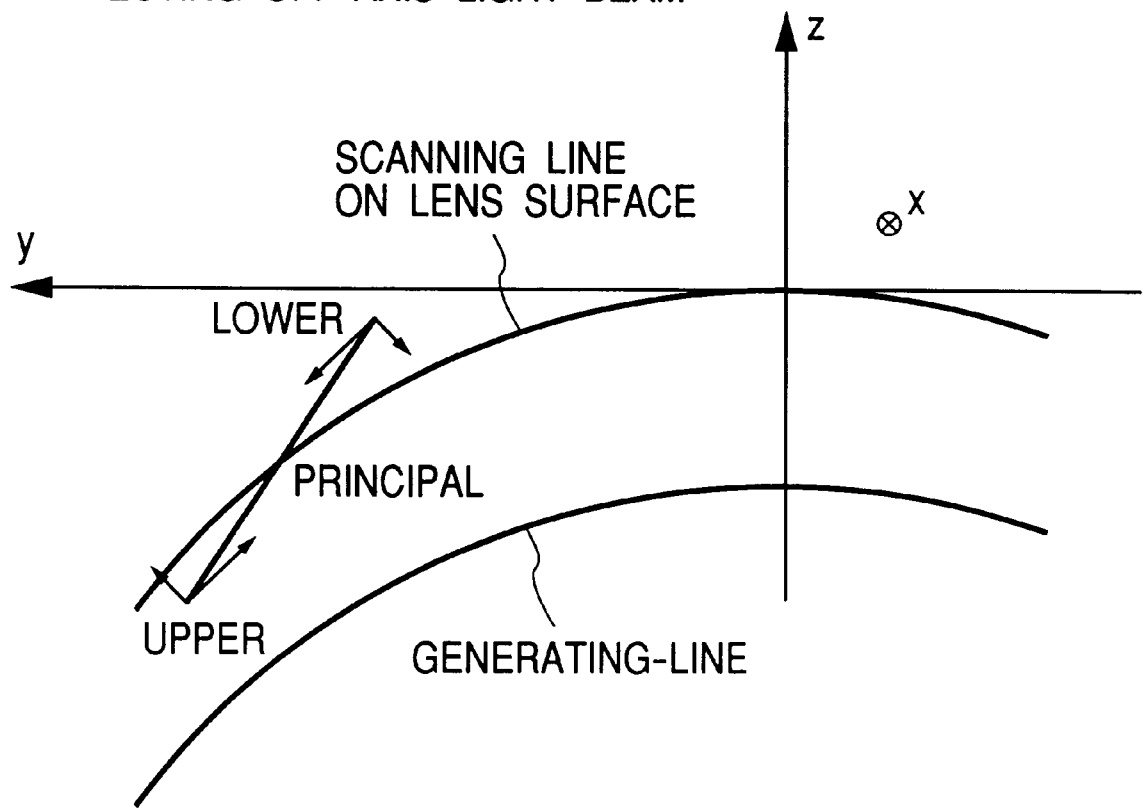
FIG. 4 is an explanatory view of the principle for solving imaging performance degradation.

In the double toric lens 4, when considering the lens shape of the toric lens 4a on the lower side of an optical axis (symmetrical axis) M of the cylindrical lens 3, the generating-lines of the first lens surface (Ra' surface) of the toric lens 4a on the polygon mirror 1 side and the second lens surface (Rb' surface) on the photosensitive drum 10 side have curvatures almost equal to the locus of the obliquely incident light beam, as shown in FIGS. 3A and 3B. More specifically, in this embodiment, the generating-line connecting the generating-line vertices of the toric lens 4a is curved in the sub scanning direction. The sub scanning direction of the toric lens 4a means a direction perpendicular to the optical axis of the lens and the main scanning direction. In this embodiment, the light beam incident at a field angle in the main scanning direction does not rotate because of the curvature of generating-line, so satisfactory imaging performance is obtained. FIG. 4 is an explanatory view showing this principle. In FIG. 4, "Principal" represents an off-axis principal ray, and "Upper" and "Lower" represent marginal light beams in the main scanning direction defined by the incidence system.

As shown in FIG. 4, when the generating-line of the toric lens 4a is curved along the scanning line, an upper light beam (Upper) and a lower light beam (Lower) around a principal ray (Principal) having a field angle in the main scanning direction are subject to a refracting power toward the principal ray P within the Y-Z plane. As a result, the images of the light beams (Upper) and (Lower) are satisfactorily formed without rotating about the principal ray P.

The principle of the curvature of generating-line of the toric lens 4a is described in detail in the earlier application (Japanese Patent Application No. 8-174332) by the present inventors, and a detailed description thereof will be omitted.

In this embodiment, the amount of curvature of scanning line at the maximum scanning field angle is about 1.09 mm on the first lens surface and about 1.87 mm on the second lens surface. The amount of curvature of generating-line is 1.16 mm on the first lens surface and 1.62 mm on the second lens surface almost in correspondence with the curvature of scanning line.

In this embodiment, the generating-lines of the first and second lens surfaces of the toric lens 4a are shifted by a predetermined amount to the lower side of the drawing (FIG. 2B) with respect to the optical axis of the toric lens 4a in the sub scanning direction. In FIGS. 3A and 3B, the absolute value on the left ordinate indicates the shift amount of the obliquely incident light beam from the optical axis. The shift amount of the first lens surface is about 52.4 mm, and that of the second lens surface is about 2.1 mm. In this embodiment, the curvature of scanning line on the photosensitive drum surface due to the obliquely incident light beam is satisfactorily corrected by the generating-line shift effect.

Figure 5:
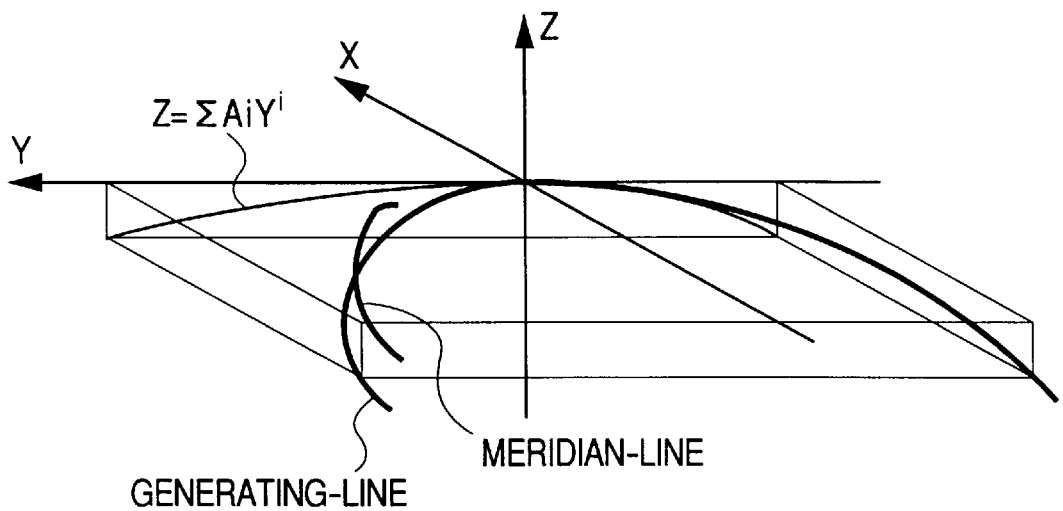
FIG. 5 is explanatory view of the definition of a toric surface having a curved generating-line.

FIG. 5 is a schematic view of the lens surface of the toric lens having a curved generating-line. The expressions of the lens surface are as follows.

Generating-line $$X = \frac{Y^2/R_u}{1 + \sqrt{1 - (1 + K_{yu})(Y/R_u)^2}} +$$
$$B_{4u}Y^4 + B_{6u}Y^6 + B_{8u}Y^8 + B_{10u}Y^{10} (Y \geq 0)$$

$$X = \frac{Y^2/R_1}{1 + \sqrt{1 - (1 + K_{y1})(Y/R_1)^2}} +$$
$$B_{41}Y^4 + B_{61}Y^6 + B_{81}Y^8 + B_{101}Y^{10} (Y < 0)$$

$$Z = \sum_{i=0}^{n} A_i Y^i (i \leq 8)$$

Meridian-line $$S = \frac{z'^2/r'}{1 + \sqrt{1 - (1 + K_{xu})(z'/r')^2}} +$$
$$D_{4u}z'^4 + D_{6u}z'^6 + D_{8u}z'^8 + D_{10u}z'^{10}$$

$$r' = r_u(1 + E_{2u}Y^2 + E_{4u}Y^4 + E_{6u}Y^6 + E_{8u}Y^8 + E_{10u}Y^{10})(Y \geq 0)$$

-continued
$$r' = r_1(1 + E_{21}Y^2 + E_{41}Y^4 + E_{61}Y^6 + E_{81}Y^8 + E_{101}Y^{10})(Y < 0)$$

In the expressions of the generating-lines, $R_u$ and $R_1$ are the radii of curvature, and $K_{yu}$, $B_{4u}$, $B_{6u}$, $B_{8u}$, $B_{10u}$, $K_{y1}$, $B_{41}$, $B_{61}$, $B_{81}$, and $B_{101}$ are aspherical coefficients.

In the expressions of the meridian-lines, $r_u$ and $r_1$ are the radii of curvature, and $K_{xu}$, $D_{4u}$, $D_{6u}$, $D_{8u}$, $D_{10u}$, $E_{2u}$, $E_{4u}$, $E_{6u}$, $E_{8u}$, $E_{10u}$, $E_{21}$, $E_{41}$, $E_{61}$, $E_{81}$, and $E_{101}$ are aspherical coefficients.

Referring to FIG. 5, the optical axis of the lens corresponds to the X-axis and matches the on-axis light beam. The main scanning direction corresponds to the Y-axis. The generating-line is a curved line connecting the meridian-line vertices. The Z-axis component of the generating-line is represented as a polynomial of the Y-coordinate value:

$$Z = \Sigma A_i Y^i \, (i=0,1,2,\ldots)$$

In this embodiment, the Z-axis component is expressed as a polynomial up to the eighth order. This polynomial represents the sub-scanning-direction amount of curvature (curve of generating-line) of the generating-line which is three-dimensionally curved and projected on the Y-Z plane. This amount of curvature corresponds to that shown in FIG. 3A or 3B.

Figure 6:
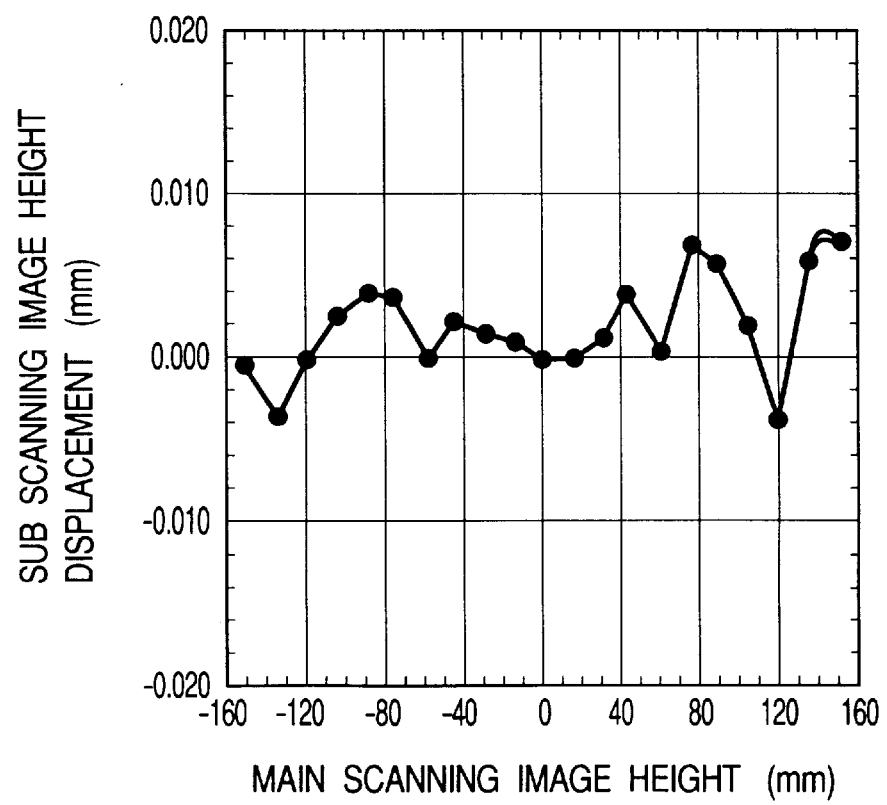
FIG. 6 is an explanatory view of the amount of curvature of scanning line obtained in the first embodiment of the present invention.

FIG. 6 shows the curvature of scanning line on the photosensitive drum surface in this embodiment. As shown in FIG. 6, the curvature of scanning line is suppressed to be 10 $\mu$m or less within the effective scanning area±150 mm. This curvature amount corresponds to a ¼ pixel or less even for a scanning line density of 600 dpi (resolution: 42.3 $\mu$m), so sufficient optical performance is ensured.

In each of the toric lenses (plastic toric lenses) 4a and 4b constituted by plastic lenses in this embodiment, the first lens surface Ra on the optical deflector 1 side is a concave surface within the main scanning section. Within the sub scanning section, the lens position corresponding to the off-axis light beam becomes closer to the polygon mirror 1 side. With increasing distance from the on-axis position, the lens back distance becomes large, and the lateral magnification increases. As described above, as the first lens surface Ra is made to a concave surface within the main scanning section, the sub-scanning-direction lateral magnification increases from the on-axis position toward the off-axis position along the main scanning direction. With this arrangement, a change in image height of the off-axis light beam upon temperature elevation is compensated using almost the same compensation value as that for a change in image height of the on-axis light beam upon temperature elevation.

For a comparison to the present invention, an optical system using a toric lens constituted by a plastic lens whose sub-scanning-direction lateral magnification does not change along the main scanning direction will be described below.

Figure 7A:
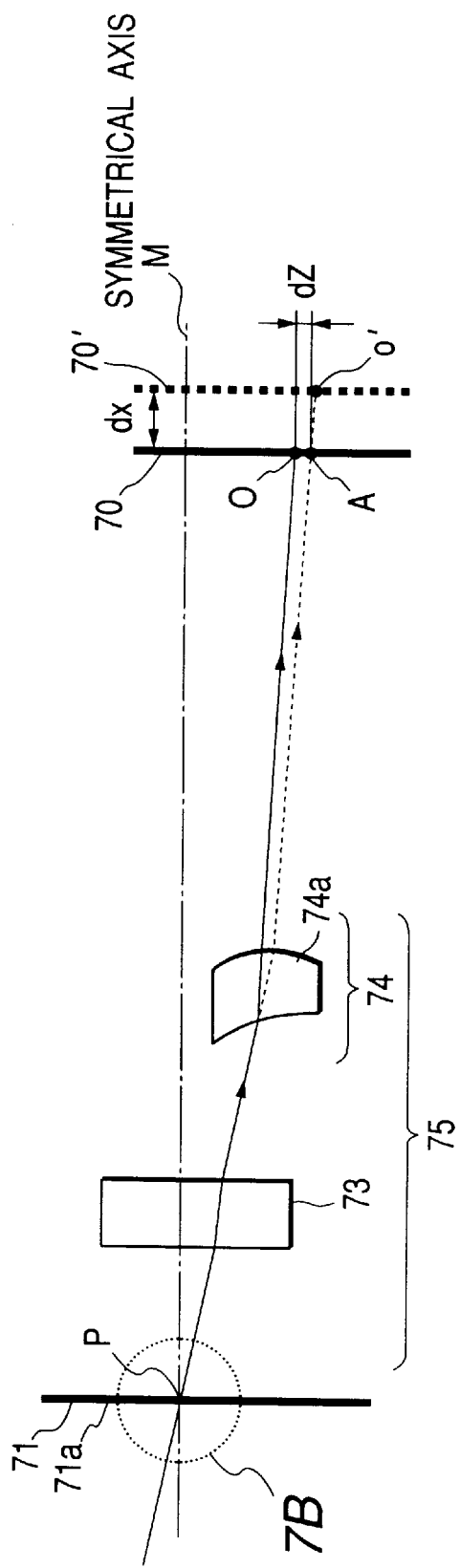
FIGS. 7A and 7B are explanatory views of an optical system of a comparative example.
Figure 7B:
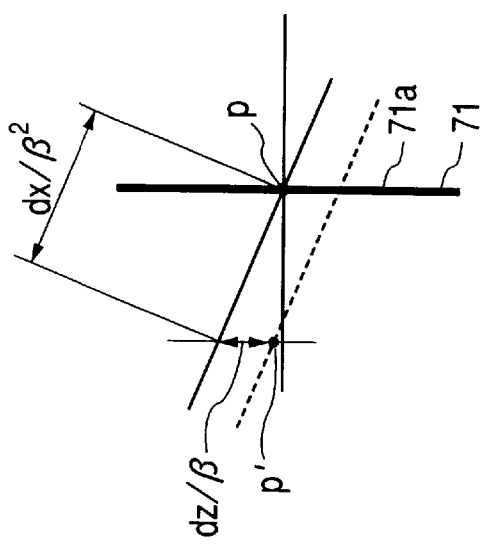

FIGS. 7A and 7B show the optical system. FIG. 7A is an exploded optical path diagram of an on-axis light beam (light beam parallel to the lens optical axis within the main scanning section) after an optical deflector of a multi-beam scanning optical apparatus within the sub scanning section. FIG. 7B is an enlarged explanatory view of a portion near the polygon mirror shown in FIG. 7A.

Referring to FIGS. 7A and 7B, an optical deflector 71 serving as a deflection means is a reflection surface of, e.g., a polygon mirror. An imaging lens (fθ lens) 75 has fθ characteristics as an imaging optical system. The imaging lens 75 is made up of two lens systems: a cylindrical lens 73 consisting of a glass material having a predetermined refracting power only in the main scanning direction and a double toric lens 74 consisting of a plastic material having different refracting powers in the main scanning direction and in the sub scanning direction. The fθ lens 12 forms the images of a plurality of light beams deflectively reflected by the optical deflector 71 at different exposure positions on a photosensitive drum surface 70 as a target scanning surface.

The double toric lens 74 shown in FIG. 7A is separated into upper and lower toric lenses (in FIG. 7A, a toric lens 74*b* on the upper side of a symmetrical axis M is not illustrated) 74*a* and 74*b* in the sub scanning direction. The double toric lens 74 is an optical system mirror-symmetrical with respect to the symmetrical axis M. A description will be made with reference to a light beam passing through the lower toric lens 74*a*.

In FIGS. 7A and 7B, the solid line indicates the optical path at ambient temperature, and the broken line indicates the optical path at elevated temperature. At ambient temperature, a light beam incident on the intersection (reflection surface position) P of a deflection surface 71*a* and the symmetrical axis M forms an image within the sub scanning section. The intersection P and a focal point (imaging point) 0 on the target scanning surface 70 are made to be optically conjugate each other by the imaging optical system 75 within the sub scanning direction. At elevated temperature, the refractive index of the plastic material lowers (e.g., −0.00012/deg for zeonex (trade name: Nippon Zeon) or apel (trade name: Mitsui Petrochemical Industries)). When the refracting power of the toric lens (to be also referred to as a plastic toric lens hereinafter) 74*a* consisting of a plastic material lowers, the conjugate point to the intersection P moves from the focal point 0 to 0'. More specifically, the image plane 70 moves to 70' by dX (shift amount), and the height in the sub scanning direction also moves by dZ (shift amount). If the shift amounts dX and dZ of the focal point position fall out of the allowance, the output image blurs.

A method of correcting the shift amounts dX and dZ will be described below. The shift amounts dX and dZ may be corrected in the following manner. Let β be the sub-scanning-direction lateral magnification of the plastic toric lens 74*a*. Since the intersection P and the focal point 0' are optically conjugate each other, the imaging position of the light beam incident on the polygon mirror 71 at the elevated temperature may be shifted by $dX/\beta^2$ along the optical axis and by $dZ/\beta$ in the sub scanning direction to move the intersection P to P'. With this design of the incident optical system (system for guiding a light beam emitted by the light source to the optical deflector), temperature compensation of the on-axis light beam is enabled.

Figure 8A:
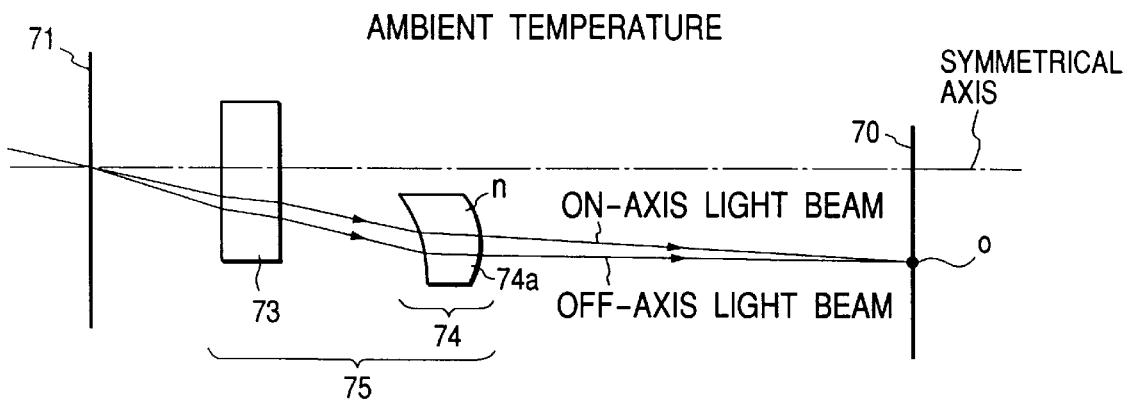
FIGS. 8A and 8B are exploded optical path diagrams of an on-axis light beam and an off-axis light beam within the sub scanning section at ambient temperature and at elevated temperature, respectively.
Figure 8B:
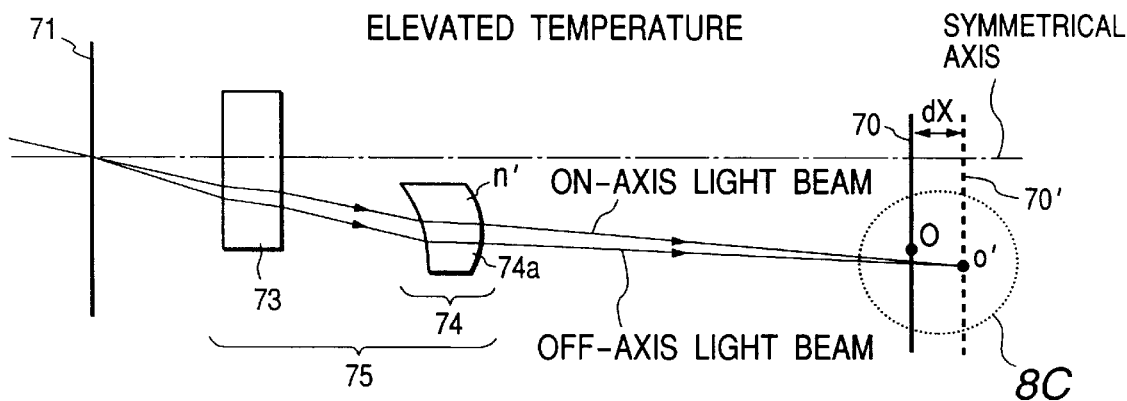

However, the off-axis light beam passes through the plastic toric lens 74*a* at a position different from that of the on-axis light beam, as shown in FIG. 8A, and receives a different refracting power. As a result, the off-axis light beam forms an image at the focal point 0 on the image plane 70. When the refracting power of the plastic toric lens 74*a* lowers at elevated temperature, the on-axis light beam and the off-axis light beam meet at the focal point 0', as shown in FIG. 8B. The shift amounts dZ of these light beams substantially equal each other but the shift amounts for compensating the image heights have a difference dZ'.

This means that the image height of the off-axis light beam does not match that of the on-axis light beam at elevated temperature, so the scanning line is curved on the image plane. Application of the above scanning optical system to a recording optical system such as a laser beam printer (LBP) or a digital copying machine results in a degradation in image such as pitch or density variations.

To prevent this, in the present invention, the sub-scanning-direction lateral magnification of the toric lens constituted by a plastic lens is increased from the on-axis position to the off-axis position along the main scanning direction, thereby compensating for the change in image height of the off-axis light beam upon temperature elevation using the same compensation value as that for the change in image height of the on-axis light beam upon temperature elevation.

Figure 8C:
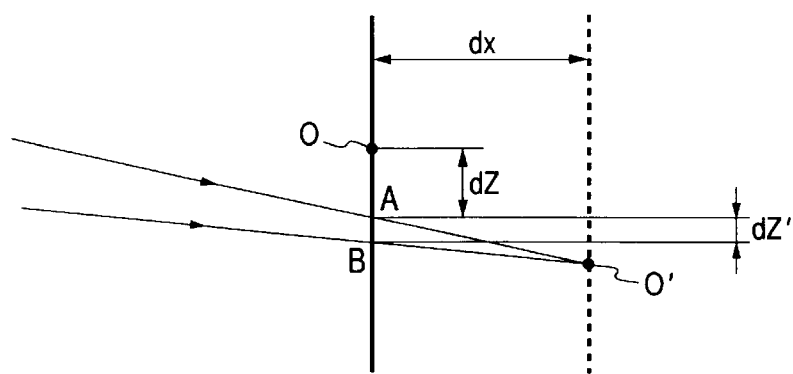
FIG. 8C is a partial enlarged view of FIG. 8B.

Referring to FIGS. 8B and 8C, the compensation value for the image height of the on-axis light beam is given by dZ/β. For the off-axis light beam, since a sub-scanning-direction lateral magnification is β', $$(dZ+dZ')/\beta'=dZ/\beta \qquad (a)$$

The curvature of scanning line of the off-axis light beam at elevated temperature can be suppressed by giving a sub-scanning-direction lateral magnification β' which satisfies equation (a). In equation (a), β is the sub-scanning-direction lateral magnification at the on-axis position of the imaging optical system (plastic toric lens), β' is the sub-scanning-direction lateral magnification at the off-axis position, dZ is the image height displacement of the on-axis light beam upon elevation of atmospheric temperature, and dZ' is the image height displacement difference between the on-axis light beam and the off-axis light beam elevation of the atmospheric temperature.

Solving equation (a) for the lateral magnification β' at the off-axis position yields:

$$\beta'=\beta\times(1+dZ'/dZ) \qquad (b)$$

As is apparent from equation (b), the sub-scanning-direction lateral magnification β at the off-axis position may be (1+dZ'/dZ) times the sub-scanning-direction lateral magnification β at the on-axis position.

Solving equation (b) for the image height displacement difference dZ' between the on-axis light beam and the off-axis light beam upon temperature elevation yields:

$$dZ'=(\beta'/\beta-1)\cdot dZ \qquad (c)$$

In this embodiment, letting ΔdZ' be the correction residual of the difference dZ' and:

$$\Delta dZ'=|dZ'-(\beta'/\beta-1)\cdot dZ|$$

the respective elements are set to satisfy:

$$\Delta dZ' \leq 20 \ (\mu m) \qquad (1)$$

Condition (1) is associated with the allowance of the correction residual ΔdZ' for obtaining a satisfactory output image even in case of a change in environment. If condition (1) is not satisfied, the output image blurs.

As described above, in this embodiment, the sub-scanning-direction lateral magnification of each of the plastic toric lenses 4*a* and 4*b* is changed from the on-axis position (optical axis) to the off-axis position along the main scanning direction while satisfying condition (1). With this arrangement, the change in image height of the off-axis light beam upon temperature elevation can be compensated using roughly the same compensation value as that for the change in image height of the on-axis light beam upon temperature elevation. Therefore, even when the atmospheric temperature changes, any curvature of scanning line can be suppressed, and pitch or density variations in an image can be reduced.

In this embodiment, the oblique incident angles of the plurality of light beams (obliquely incident light beams) which obliquely strike the deflection surface of the polygon mirror 1 are set to be substantially symmetrical with respect to the sub scanning direction. The amounts of curvature of generating-lines of the upper and lower toric lenses 4*a* and 4b of the double toric lens 4 may be mirror-symmetrical with respect to the symmetrical axis. That is, when one of the upper and lower toric lenses is designed, the shape of the other lens is determined by itself as a mirror symmetrical shape. Therefore, the design process can be simplified, and the functions of the toric lenses can be made equal.

In this embodiment, when one of two light beams (incident light beams) is obliquely incident on the deflection surface within the sub scanning section while the other is perpendicularly incident on the deflection surface, a normal toric lens can be used for the latter. By forming the toric lens corresponding to the obliquely incident light beam into the above-described shape and changing the sub-scanning-direction lateral magnification in accordance with a distance away from the on-axis position to the off-axis position along the main scanning direction while satisfying condition (1), the present invention can obtain the same effect as in the first embodiment.

In this embodiment, a plurality of light beams are used to perform multi-beam scanning. However, when a single light beam is obliquely incident on the deflection surface of the optical deflector in the sub scanning direction, a toric lens constituting one element of the fθ lens is formed into the above-described shape, and the sub-scanning-direction lateral magnification is changed in accordance with a distance away from the on-axis position to the off-axis position along the main scanning direction while satisfying condition (1), the present invention can be applied, as in the first embodiment.

magnification changes only by 2% for the image height at the 100% off-axis position, as shown in Table 4. For this reason, the curvature of scanning line at elevated temperature of 25° C. is as large as −30 μm. When temperature compensation is not performed for the incident optical system, the offset of scanning line due to a decrease in refractive index at elevated temperature of 25° C. is 0.130 mm (corresponding to the shift amount dZ shown in FIG. 8C) at the on-axis position, and −0.160 mm (corresponding to the shift amount dZ' shown in FIG. 8C) at the 100% off-axis position. The change of only 2% is negligible. The sub-scanning-direction lateral magnification needs to be changed by at least 5%; otherwise, the effect of reducing the curvature of scanning line cannot be expected.

On the basis of equation (b): $\beta'=\beta\times(1+dZ'/dZ)$, the ideal value is $\beta'=1.23\beta$ at which the curvature of scanning line at the 100% off-axis position substantially becomes zero. In this embodiment, $\beta'=1.08\beta$, so the effect becomes about ⅓. The curvature of 13 μm considerably matches the deviation from the ideal sub-scanning-direction lateral magnification, proving that the equation is correct. Needless to say, the change in the sub-scanning-direction lateral magnification provides the effect of reducing the curvature of scanning line.

TABLE 1

Specifications of Scanning Optical System

| Surface No. | r Radius of curvature in main scanning section (Reference value) Base R of aspherical surface | Surface interval | n1 (dT = 0) (λ = 675 nm) | n2 (dT = 25) |
|---|---|---|---|---|
| Polygon mirror | 1 | 0 | 18.64025 | | |
| Cylindrical lens | 2 | −59.61747 | 10.13713 | 1.619010 | 1.619010 |
|  | 3 | −62.62044 | 49.59225 | | |
| Plastic toric lens | 4 | −301.73078 | 13.6485 | 1.526878 | 1.523878 |
|  | 5 | −123.664 | 298.39083 | | |
| Image plane | 6 | 0 | 0 | | |

Tables 1 and 2 show the design values of the optical system of the scanning optical apparatus of the present invention, and Tables 3 and 4 show those of a scanning optical apparatus as a comparative example. These will be compared and described below. Tables 1 and 3 show the optical system arrangements and lens arrangements. Tables 2 and 4 show the sub-scanning-direction lateral magnifications of the optical systems and the curvatures of scanning line.

In the embodiment of the present invention, r (paraxial radius of curvature) of the first lens surface of the plastic toric lens is set to be −301.73 within the main scanning section, as shown in Table 1. With this arrangement, as shown in Table 2, the sub-scanning-direction lateral magnification (sub scanning magnification) for the image height at the 100% off-axis position can be increased by 8% as compared to that on the lens axis. As a result, at elevated temperature of 25° C., the curvature of scanning line can be reduced to −13 μm for the image height at the 100% off-axis position as compared to that at ambient temperature.

When r=0 for the first lens surface of the plastic toric lens, as shown in Table 3, the sub-scanning-direction lateral

TABLE 2

Sub Scanning Magnification and Curvature of Scanning Line

| Main scanning image height | | On-axis | 100% |
|---|---|---|---|
| Sub scanning magnification | | 2.74 | 2.97 |
| (Magnification ratio) | | 1.00 | 1.08 |
| Curvature of scanning line | (Ambient temperature: 25° C.) | 0 | −0.0034 |
|  | (Temperature elevated 25° C.) | 0 | −0.0132 |

TABLE 3

Specifications of Scanning Optical System

| | Surface No. | r Radius of curvature in main scanning section (Reference value) Base R of aspherical surface | Surface interval | Glass material | n1 (dT = 0) (λ = 675 nm) | n2 (dT = 25) |
|---|---|---|---|---|---|---|
| Polygon mirror | 1 | 0 | 30.28838 | | | |
| Cylindrical lens | 2 | −65.84241 | 23.62491 | bsm15 | 1.619010 | 1.619010 |
| | 3 | −72.13475 | 52.7136 | | | |
| Plastic toric lens | 4 | 0 | 9.38 | zeonex | 1.526878 | 1.523878 |
| | 5 | −179.36612 | 302.99759 | | | |
| Image plane | 6 | 0 | 0 | | | |

TABLE 4

Sub Scanning Magnification and Curvature of Scanning Line

| Main scanning image height | | On-axis | 100% |
|---|---|---|---|
| Sub scanning magnification (Magnification ratio) | | 2.74 1.00 | 2.97 1.02 |
| Curvature of scanning line | (Ambient temperature: 25° C.) | 0 | −3.4 |
| | (Temperature elevated 25° C.) | 0 | dz' = −0.030 |
| Offset of scanning line | (Temperature elevated 25° C.) | dz = −0.130 | −0.16 |

According to the present invention, the sub-scanning-direction lateral magnification of the toric lens made of a plastic lens constituting one element of the imaging optical system is changed to increase in accordance with a distance away from the on-axis position to the off-axis position along the main scanning direction, as described above. Even at elevated temperatures, temperature compensation of the image plane can be performed by the incident optical system without generating any curvature of the scanning line. Therefore, a scanning optical apparatus capable of suppressing any curvature of the scanning line and reducing pitch or density variations in an image when the atmospheric temperature changes can be provided.

What is claimed is:

1. A scanning optical apparatus comprising:
   light source means;
   an optical deflector for deflecting a light beam emitted by said light source means;
   optical means for causing the light beam emitted by said light source means to be obliquely incident on a deflection surface of said optical deflector within a sub scanning section; and
   an imaging optical system for forming an image of the light beam deflectively reflected by said optical deflector on a surface to be scanned, said imaging optical system having a sub-scanning-direction lateral magnification which changes in accordance with a distance away from an on-axis position to an off-axis position along a main scanning direction,
   wherein letting β be the sub-scanning-direction lateral magnification of said imaging optical system at the on-axis position, β' the sub-scanning-direction lateral magnification at the off-axis position, dZ an image height displacement of an on-axis light beam upon elevation of an atmospheric temperature, dZ' an image height displacement difference between the on-axis light beam and an off-axis light beam upon elevation of the atmospheric temperature, and ΔdZ' a correction residual of the difference dZ', when the correction residual ΔdZ' is given by:

$\Delta dZ' = |dZ' - (\beta'/\beta - 1) \cdot dZ|$ the following condition is satisfied:

$\Delta dZ' \leq 20 \, (\mu m)$.

2. An apparatus according to claim 1, wherein said imaging optical system has a lens having a meniscus lens shape within a main scanning section, essentially consisting of plastic, and having a positive refracting power.

3. An apparatus according to claim 1, wherein said light source means comprises a plurality of light sources.

4. An apparatus according to claim 3, wherein said optical means causes a plurality of light beams emitted by said light source means to be non-parallely incident on said deflection surface of said optical deflector.

5. An apparatus according to claim 3, wherein said imaging optical system has a plurality of rotational asymmetrical lenses each having an optical axis substantially parallel to the light beam incident on the lens, and a generating-line connecting meridian-line vertices of each of said plurality of rotational asymmetrical lenses is curved in a sub scanning direction.

6. An apparatus according to claim 1, wherein said deflection surface of said optical deflector and said surface of said recording medium are made to be optically conjugate with each other within the sub scanning section by said imaging optical system.

7. A scanning optical apparatus comprising:
   light source means;
   an optical deflector for deflecting a light beam emitted by said light source means;
   optical means for causing the light beam emitted by said light source means to be obliquely incident on a deflection surface of said optical deflector within a sub scanning section; and
   an imaging optical system for forming an image of the light beam deflectively reflected by said optical deflector on a surface to be scanned, said imaging optical system having a sub-scanning-direction lateral magnification which changes in accordance with a distance away from an on-axis position to an off-axis position along a main scanning direction, wherein said imaging optical system has a cylindrical lens and a toric lens constituted by a plastic lens whose lens surface on said optical deflector side comprises a concave surface within a main scanning section.

8. An apparatus according to claim 7, wherein said imaging optical system has a lens having a meniscus lens shape within a main scanning section, essentially consisting of plastic, and having a positive refracting power.

9. An apparatus according to claim 7, wherein said light source means comprises a plurality of light sources.

10. An apparatus according to claim 9, wherein said optical means causes a plurality of light beams emitted by said light source means to be non-parallely incident on said deflection surface of said optical deflector.

11. An apparatus according to claim 9, wherein said imaging optical system has a plurality of rotational asymmetrical lenses each having an optical axis substantially parallel to the light beam incident on the lens, and a generating-line connecting meridian-line vertices of each of said plurality of rotational asymmetrical lenses is curved in a sub scanning direction.

12. An apparatus according to claim 7, wherein said deflection surface of said optical deflector and said surface of said recording medium are made to be optically conjugate with each other within the sub scanning section by said imaging optical system.

13. A laser beam printer apparatus comprising:

light source means;

an optical deflector for deflecting a light beam emitted by said light source means;

optical means for causing the light beam emitted by said light source means to be obliquely incident on a deflection surface of said optical deflector within a sub scanning section;

a recording medium; and an imaging optical system for forming an image of the light beam deflectively reflected by said optical deflector on a surface of said recording medium, said imaging optical system having a sub-scanning-direction lateral magnification which changes in accordance with a distance away from an on-axis position to an off-axis position along a main scanning direction, wherein letting $\beta$ be the sub-scanning-direction lateral magnification of said imaging optical system at the on-axis position, $\beta'$ the sub-scanning-direction lateral magnification at the off-axis position, dZ an image height displacement of an on-axis light beam upon elevation of an atmospheric temperature, dZ' an image height displacement difference between the on-axis light beam and an off-axis light beam upon elevation of the atmospheric temperature, and $\Delta dZ'$ a correction residual of the difference dZ', when the correction residual $\Delta dZ'$ is given by:

$$\Delta dZ' = |dZ' - (\beta'/\beta - 1) \cdot dZ|$$

the following condition is satisfied:

$$\Delta dZ' \leq 20 \ (\mu m).$$

14. An apparatus according to claim 13, wherein said imaging optical system has a lens having a meniscus lens shape within a main scanning section, essentially consisting of plastic, and having a positive refracting power.

15. An apparatus according to claim 13, wherein said light source means comprises a plurality of light sources.

16. An apparatus according to claim 15, wherein said optical means causes a plurality of light beams emitted by said light source means to be non-parallely incident on said deflection surface of said optical deflector.

17. An apparatus according to claim 15, wherein said imaging optical system has a plurality of rotational asymmetrical lenses each having an optical axis substantially parallel to the light beam incident on the lens, and a generating-line connecting meridian-line vertices of each of said plurality of rotational asymmetrical lenses is curved in a sub scanning direction.

18. An apparatus according to claim 13, wherein said deflection surface of said optical deflector and said surface of said recording medium are made to be optically conjugate with each other within the sub scanning section by said imaging optical system.

19. A laser beam printer apparatus comprising:

light source means;

an optical deflector for deflecting a light beam emitted by said light source means;

optical means for causing the light beam emitted by said light source means to be obliquely incident on a deflection surface of said optical deflector within a sub scanning section;

a recording medium; and an imaging optical system for forming an image of the light beam deflectively reflected by said optical deflector on a surface of said recording medium, said imaging optical system having a sub-scanning-direction lateral magnification which changes in accordance with a distance away from an on-axis position to an off-axis position along a main scanning direction, wherein said imaging optical system has a cylindrical lens and a toric lens constituted by a plastic lens whose lens surface on said optical deflector side comprises a concave surface within a main scanning section.

20. An apparatus according to claim 19, wherein said imaging optical system has a lens having a meniscus lens shape within a main scanning section, essentially consisting of plastic, and having a positive refracting power.

21. An apparatus according to claim 19, wherein said light source means comprises a plurality of light sources.

22. An apparatus according to claim 21, wherein said optical means causes a plurality of light beams emitted by said light source means to be non-parallely incident on said deflection surface of said optical deflector.

23. An apparatus according to claim 21, wherein said imaging optical system has a plurality of rotational asymmetrical lenses each having an optical axis substantially parallel to the light beam incident on the lens, and a generating-line connecting meridian-line vertices of each of said plurality of rotational asymmetrical lenses is curved in a sub scanning direction.

24. An apparatus according to claim 19, wherein said deflection surface of said optical deflector and said surface of said recording medium are made to be optically conjugate with each other within the sub scanning section by said imaging optical system.

* * * * *

UNITED STATES PATENT AND TRADEMARK OFFICE
CERTIFICATE OF CORRECTION

PATENT NO. : 6,046,835

DATED : April 4, 2000

INVENTOR(S): TAKESHI YAMAWAKI, ET AL.

It is certified that error appears in the above-identified patent and that said Letters Patent is hereby corrected as shown below:

COLUMN 3
   Line 50, "direction" should read --direction are--.

COLUMN 7
   Line 21, "conjugate" should read --conjugate with--.

COLUMN 8
   Line 30, "β" should read --β'--.

Signed and Sealed this

Twenty-second Day of May, 2001

*Attest:*

NICHOLAS P. GODICI

*Attesting Officer*     *Acting Director of the United States Patent and Trademark Office*